United States Patent
Stoneback

(10) Patent No.: US 9,205,524 B2
(45) Date of Patent: Dec. 8, 2015

(54) TEST GAUGE

(76) Inventor: John Wayne Stoneback, Madison, OH (US)

(*) Notice: Subject to any disclaimer, the term of this patent is extended or adjusted under 35 U.S.C. 154(b) by 1064 days.

(21) Appl. No.: 13/144,823

(22) PCT Filed: Jan. 15, 2010

(86) PCT No.: PCT/US2010/021174
§ 371 (c)(1),
(2), (4) Date: Sep. 12, 2011

(87) PCT Pub. No.: WO2010/083399
PCT Pub. Date: Jul. 22, 2010

(65) Prior Publication Data
US 2012/0017671 A1    Jan. 26, 2012

Related U.S. Application Data

(60) Provisional application No. 61/145,353, filed on Jan. 16, 2009.

(51) Int. Cl.
*B23Q 17/09* (2006.01)
*B23Q 17/00* (2006.01)

(52) U.S. Cl.
CPC .................................. *B23Q 17/005* (2013.01)

(58) Field of Classification Search
CPC ............................... B23Q 17/005; B23Q 17/09
USPC ........... 73/104; 33/1 BB, 531, 532, 549, 551, 33/552
See application file for complete search history.

(56) References Cited

U.S. PATENT DOCUMENTS

| | | | |
|---|---|---|---|
| 2,490,376 A * | 12/1949 | Rupley | ............................ 33/532 |
| 2,506,082 A | 5/1950 | Hartman | |
| 3,102,343 A | 9/1963 | Plank | |
| 3,827,293 A | 8/1974 | Hohberger | |
| 4,433,488 A | 2/1984 | Baumgartner | |
| 5,639,953 A | 6/1997 | Renslow | |
| 6,446,348 B1 * | 9/2002 | Brian | ............................ 33/532 |

OTHER PUBLICATIONS

International Search Report PCT/US2010/021174, published Jul. 23, 2010.
PCT/US2009/060490 International Search Report and Written Opinion; date of mailing Dec. 9, 2009.

* cited by examiner

*Primary Examiner* — Daniel S Larkin
(74) *Attorney, Agent, or Firm* — Tarolli, Sundheim, Covell & Tummino LLP

(57) ABSTRACT

A test gauge for determining whether a tool holder assembly that utilizes a retention knob is properly assembled. The test gauge is mounted on a tool holder before the installation of a retention knob. Measurement devices, such as dial indicators, determine whether a "wobble" exists between the test gauge and the tapered surface of the tool holder and also provide a distance measurement between the test gauge and a reference surface on the tool holder. After installation of the retention knob, the test gauge is again placed on the tool holder in the same relative position and the distance between the test gauge and the reference surface is again observed. Any change in the distance measurement is an indication that the installation of the retention knob produced a distortion in the tool holder tapered surface.

12 Claims, 6 Drawing Sheets

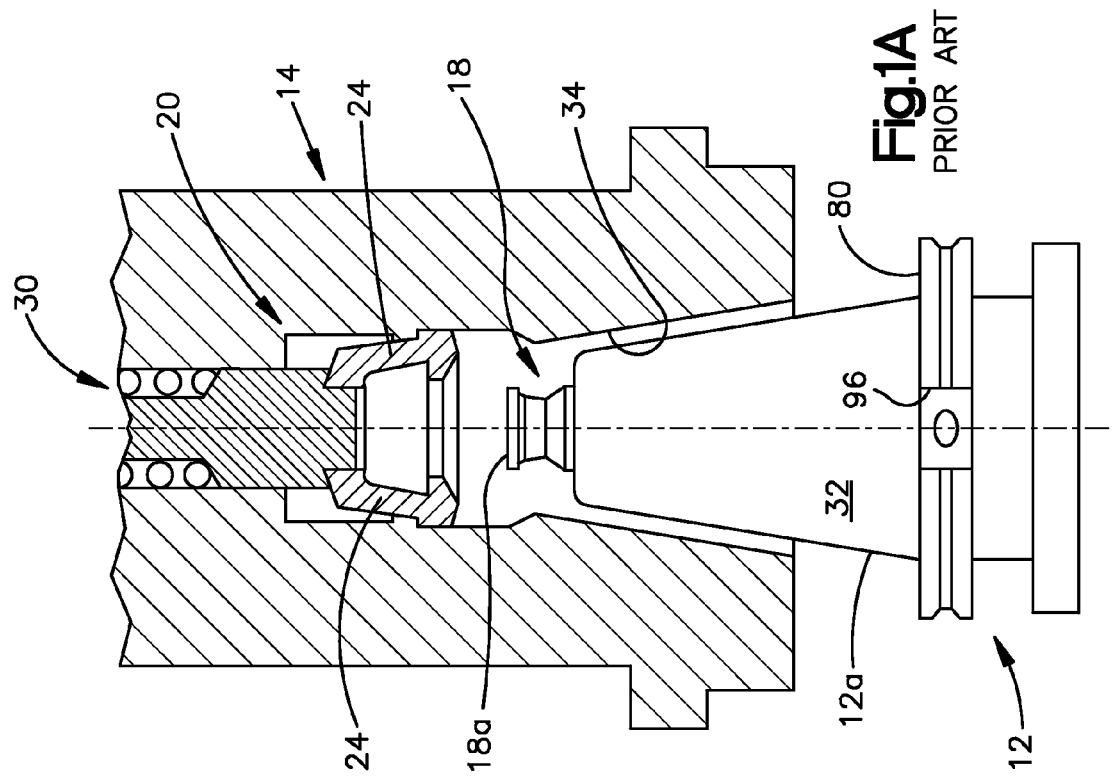
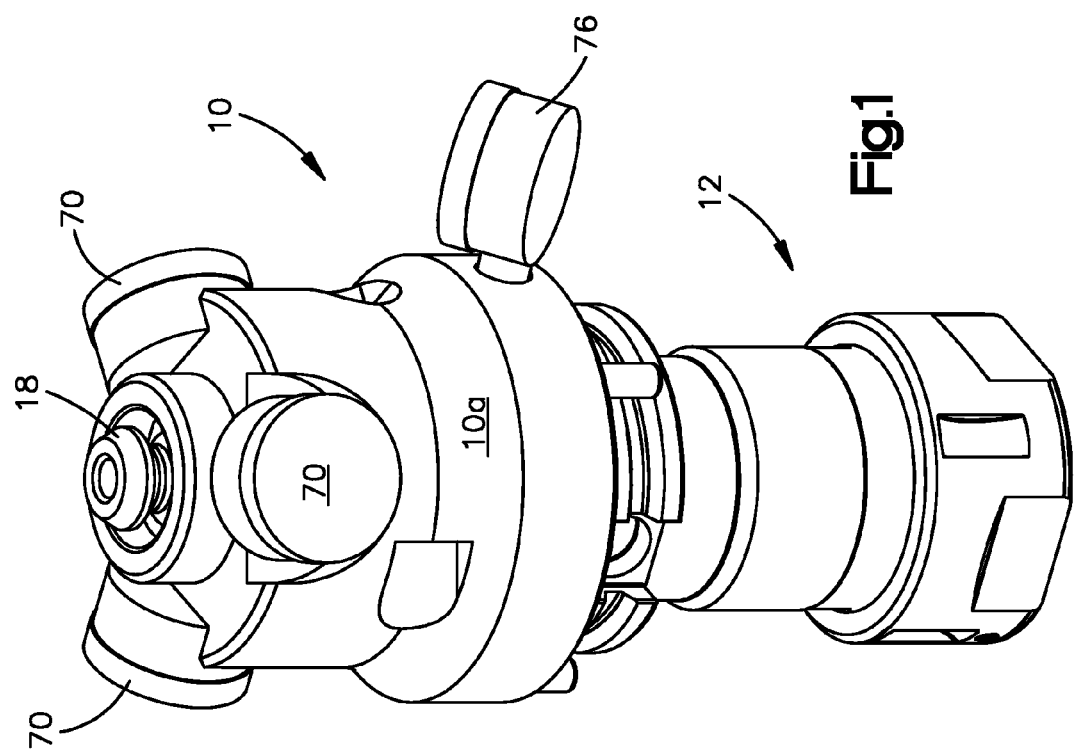

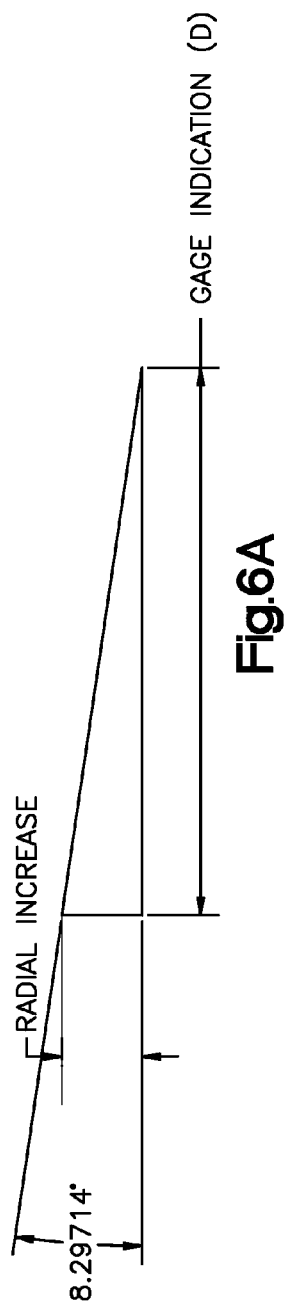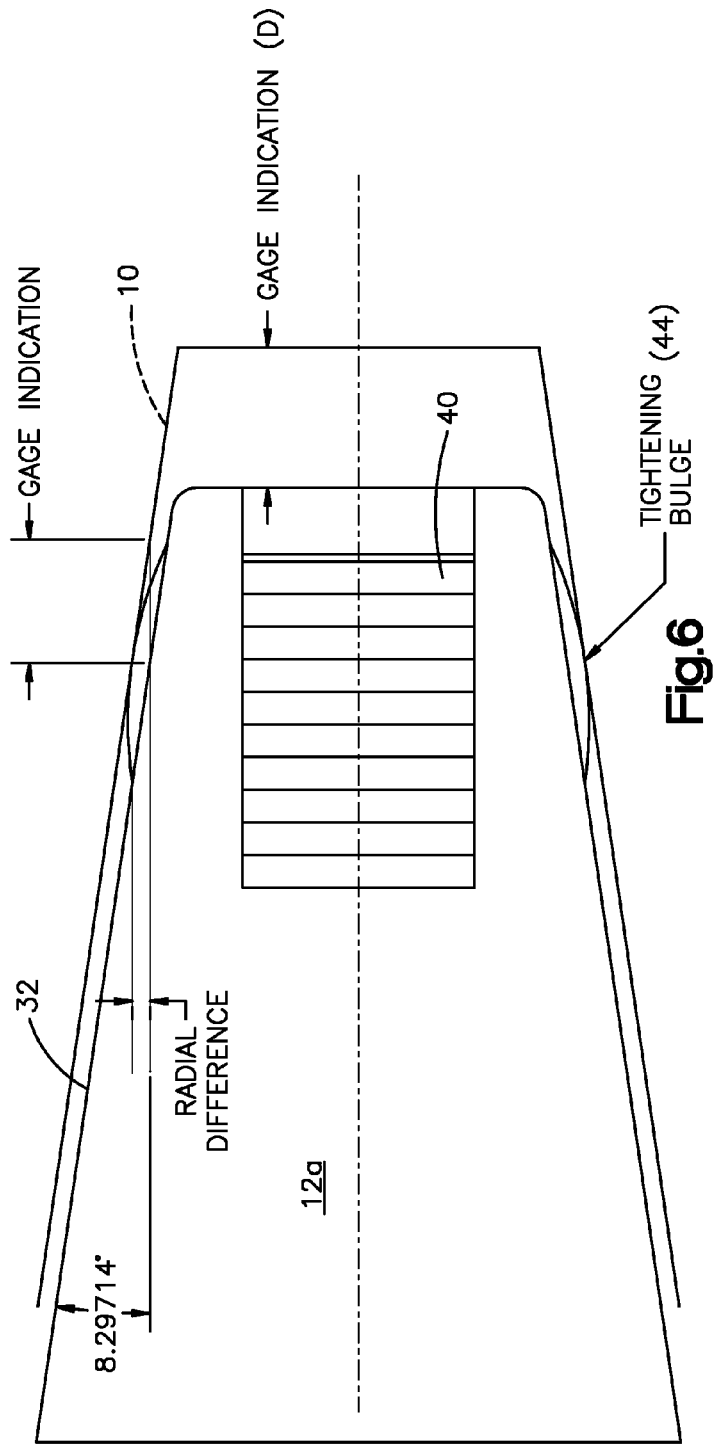

TEST GAUGE

CROSS REFERENCES TO RELATED APPLICATIONS

This application filed under 35 U.S.C §371 is a national phase application of International Application Serial Number PCT/US2010/021174 filed Jan. 15, 2010, which claims priority to U.S. Provisional Application 61/145,353, filed Jan. 16, 2009.

TECHNICAL FIELD

The present invention relates generally to machine tools and, in particular, to a test gauge for determining whether tool holders that use retention knobs have been properly assembled.

BACKGROUND ART

Machine tools, such as CNC machines, use a plurality of tools to produce a machined product. Cutting tools, such as end mills and drills, are automatically changed during a machining operation. The cutting tools are typically held in tool holders which are automatically installed and removed from machine spindles, as needed. In order to maintain precise tolerances, the tool holder must be rigidly held within the spindle. If relative movement occurs between the spindle and tool holder, machining errors will result and machining tolerances will be compromised.

A tool holder of the type to which this invention pertains, includes a tapered shank which is received in a complementally-shaped spindle socket. In order to maintain machine tolerances, it is critical that the tapered shank of the tool holder be intimate and substantially full contact with the spindle socket. If the tool holder shank is not in full contact with the spindle socket, relative movement may occur, especially under heavy machining, which will produce wear in the tool holder shank or the spindle socket or both.

In the tool holder of the type to which this invention pertains, a retention knob is threadedly received by the shank. The retention knob is engaged by a spindle gripper and holds the tool holder within the spindle during the machining operation. It has been found, that if the retention knob is not properly installed in the tool holder, i.e., it is overtightened, a distortion in the tool holder shank could be created. This distortion may prevent the tool holder shank from fully engaging the spindle socket when the tool holder is installed. If the tool holder shank is not in full contact with the spindle socket, relative movement between the tool holder and socket may occur. This relative movement will decrease machine tolerances increase cutting tool wear and produce wear in the tool holder and/or spindle.

DISCLOSURE OF INVENTION

The present invention provides a new and improved test gauge and test method that is used to confirm that a retention knob forming part of a tool holder has been properly installed. According to the invention, the test gauge includes a test body that defines a tapered bore adapted to receive an associated tapered surface forming part of the tool holder. At least one measurement device is mounted to the test gauge body and is operative to measure the distance between a reference point on the gauge body and a reference surface on the tool holder. In the preferred and illustrated embodiment, the measurement device is at least one dial indicator having an operating member reciprocally movable along a path substantially parallel to an axis of the tapered bore. The dial indicator is located in the tool body such that when the gauge body is placed on the gauge holder, the operating member is engageable by the reference surface defined by the tool holder. In the preferred and illustrated embodiment, reference surface is defined by a drive collar that forms part of the tool hold.

In a more preferred embodiment, three symmetrically spaced dial indicators are mounted on the test gauge body and are concurrently engageable with the reference surface defined on the drive collar. Preferably, the test gauge body also mounts two other measurement devices such as dial indicators that are oriented to engage either end of the tapered surface of a tool holder shank when the test gauge is placed on a tool holder. This measurement device, i.e., dial indicator is used to determine whether there is a "wobble" between the test gauge and the tool holder when the test gauge is placed in position.

According to a feature of the invention, the test gauge includes a plurality of stand-offs for spacing the gauge body above a work surface to inhibit engagement between the measuring devices and the work surface. When dial indicators are used as the measurement devices, it is important that their operating pins not be unnecessarily contacted by obstructions or other surfaces when not in use. According to a more preferred embodiment, one of the standoffs is configured as a locating pin that is engageable with a drive slot formed in a tool holder being tested. This locating pin insures that the test gauge body is located in the same relative position on the tool holder whenever a measurement is made.

The present invention provides a method for determining whether the tapered surface forming part of a toot holder or tool holder shank is distorted. This is achieved by placing the test gauge on the tool holder prior to the installation of a retention knob. The test gauge is then used to measure the distance between a reference point on its gauge body and a reference on the tool holder. The gauge body may include multiple measurement devices so that multiple measurements can be made concurrently. The retention knob is then installed in the tool holder and the gauge body is again placed on the tool holder. Measurements are again taken between the reference point on the gauge body and the reference surface on the tool holder. If the first and second measurements are substantially the same, the installation of the retention knob has not caused distortion in the tool holder shank.

In order to insure accuracy, in the preferred method, the gauge body is placed in the same rotative position on the tool holder for both measurements. The gauge body may include a locating pin for engaging a slot or other structure on the tool holder.

Additional features of the invention will become apparent and a faller understanding obtained by reading the following detailed description made in conjunction with the accompanying drawings.

BRIEF DESCRIPTION OF DRAWINGS

FIG. 1 is a perspective view of a test gauge constructed in accordance with a preferred embodiment of the invention shown installed onto a tool holder;

FIG. 1A is a fragmentary view of a machine tool spindle showing how a tool holder is held in operative engagement with the spindle;

FIGS. 6 and 6A schematically show how a calculation is made using the test gauge.

BEST MODE FOR CARRYING OUT THE INVENTION

Figure 2:
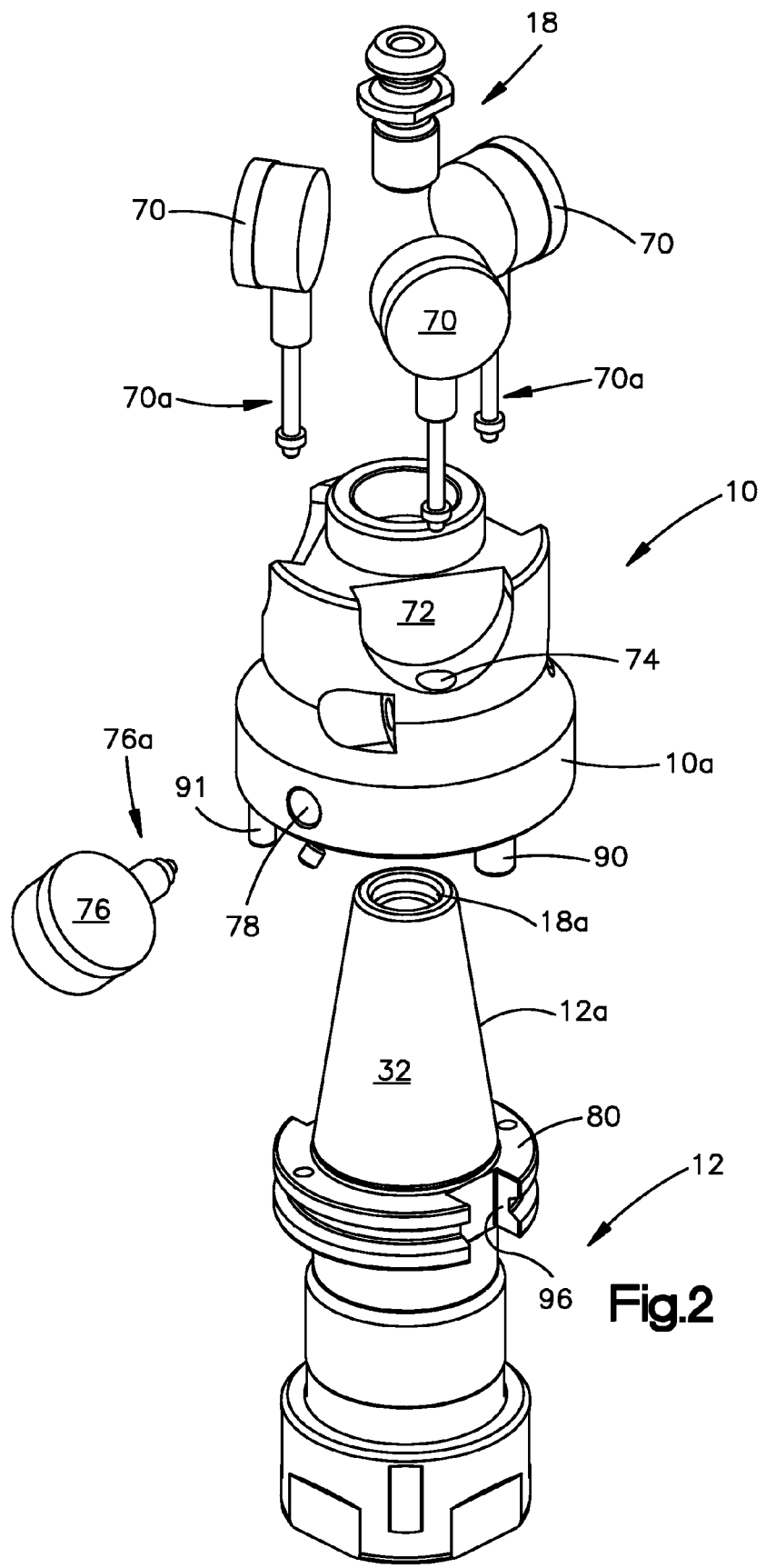
FIG. 2 is an exploded view of the test gauge and tool holder shown in FIG. 1.

FIG. 1 illustrates the overall construction of a test gauge 10 constructed in accordance with a preferred embodiment of the invention. In FIG. 1, the test gauge 10 is shown mounted on a tool holder 12. The test gauge 10 is used to determine whether the tool holder assembly is properly assembled and, in particular, has not been distorted by the installation of a "retention knob" to be described.

Referring to FIG. 1A, the tool holder 12 and a spindle with which the tool holder 12 is used, are shown. As is known, the tool holder 12 is used to mount replaceable machining tools, such as cutters, drills, mills etc., in a machine tool, such as a CNC machine. As seen in FIG. 1A, the tool holder 12 is removably held in a spindle indicated generally by reference character 14 which forms part of the CNC machine. The tool holder includes a retention knob 18, which is generally threadably received in a bore formed in a shank 12a of the tool holder 12. The spindle 14 includes a gripper mechanism indicated generally by reference character 20, which includes grippers 24 that are operative to grip a head 18a of the retention knob 18. The gripper assembly 20 draws the shank 12a of the tool holder 12 into the spindle 14 and rigidly couples the tool holder 12 to the spindle 14 such that rotation of the spindle causes rotation in the tool holder, and hence the machining tool (not shown) carried by the tool holder 12. The tool holder 12 is maintained in its operative position inside the spindle 14 by a spring or spring mechanism indicated generally by the reference character 30.

As seen in FIG. 1A, the tool holder shank 12a includes a frustum-shaped or tapered mounting surface 32 that confrontingly engages a complementally shaped spindle bore or socket 34. The angle of the taper on the shank 12 is an industry standard. It should be noted, that several sized tapers are used in the industry. In the illustrated embodiment, the angle of the taper is 8.29714 degrees per side. This is also referred to as a 3.500" taper per foot, or 7/24 step taper or 8° 17' 49.7" per side.

In order to provide precise machine tolerances, it is critical that the tapered surface 32 of the tool shank 12a has full contact with the tapered surface defined by the spindle socket 34. If full contact is not established, relative movement between the tool holder 12 and spindle 14 will occur, especially under heavy machining loads. This movement will produce machining errors and, thus, machine tolerances will not be maintained. It will also cause wear in the tool shank 12 and spindle 14 and reduce the life of the cutting tool.

As indicated above, the tool holder 12 includes a replaceable retention knob 18 by which the tool holder 12 is held in the spindle 14. The retention knob 18 is threaded into a threaded bore 40 defined by the tool holder shank 12a (see FIG. 3). It should be noted that the retention knob 18 can be of any design or to any standard with extra features of any kind so long as the threads are compatible and it has a flange to tighten the threads against and some way to rotate the knob such as flats, which are used to torque the knob to a desired number of ft/lbs (foot/pounds). It is generally recommended, that the retention knob 18 be installed in the tool holder 12 with a specific torque. It has been discovered, that if improperly installed, a retention knob that has been over torqued, can produce a distortion in the tool holder shank 12a, which, in particular, distorts its conical outside surface 32. More recently, it has been found that even standard retention knobs torqued to proper specification can also produce distortion in the toolholder shank 12a, i.e., produce an increase in diameter of the narrow diameter end of the tool shank.

Figure 4:
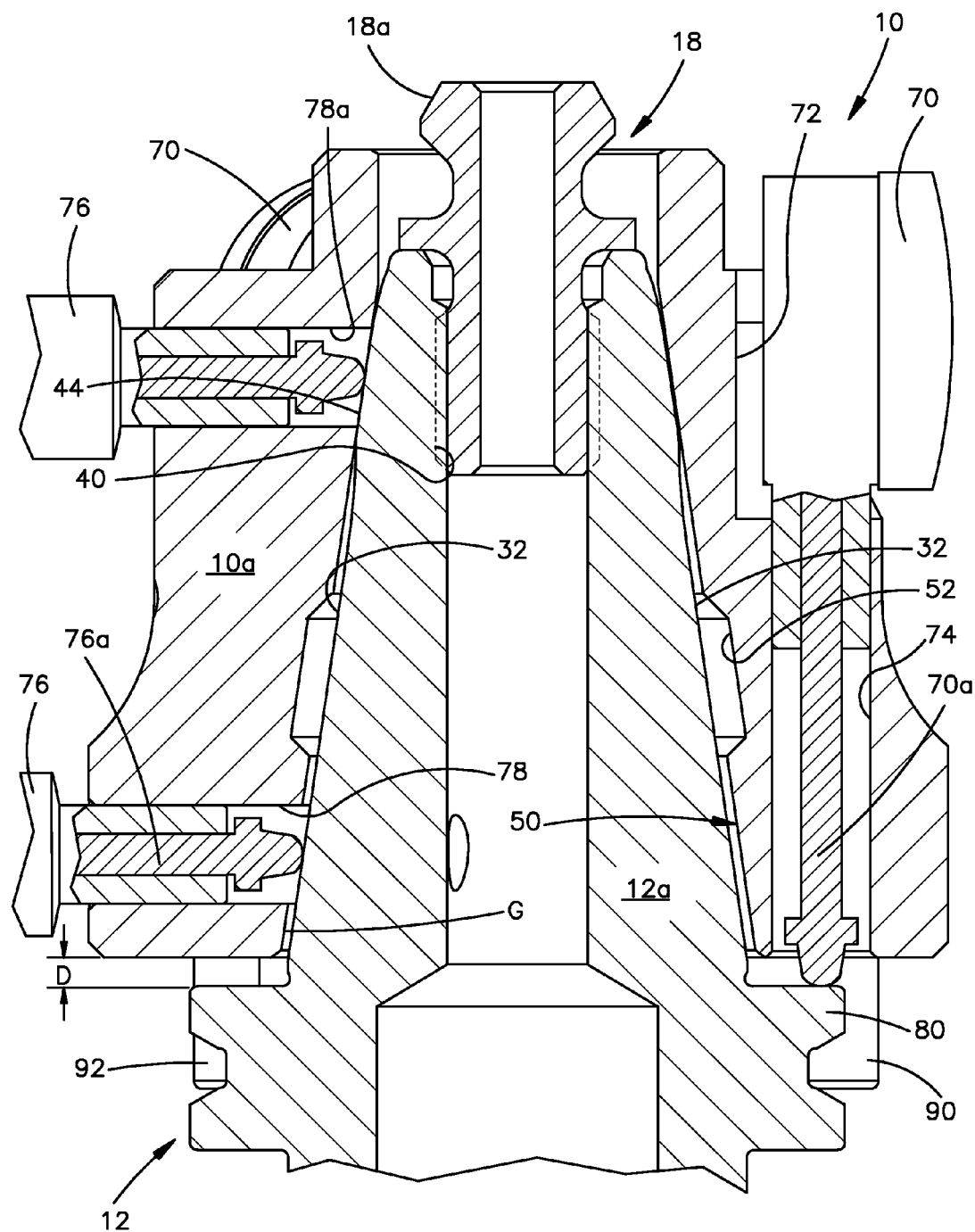
FIG. 4 is a fragmentary sectional view of the test gauge shown mounted on a tool holder that is measuring a distortion in a shank of the tool holder.

FIG. 4 illustrates a distortion in the upper end of the tool holder shank 12a that may be produced by installation of a standard retention knob 18. This distortion is even more pronounced if the retention knob is over torqued. It should be noted here, that the distortion shown in FIG. 4 has been exaggerated for purposes of explanation. As seen in FIG. 4, the distortion is a "bulge" 44 or a diameter increase at the upper part of the cone-shaped mounting surface 32. As an example, manufacturers grind tolerance on AT3 taper shanks tool holder is 0.0000787" total. Using this as a reference, the tests found that the expansion of toolholder shanks when retention knobs were installed and torque to 80 ft/lbs, was from two to ten times the grind tolerance out of tolerance. It has been also found that even a small increase in diameter can produce machining errors that detrimentally affect machining tolerances. Moreover, if the distortion reduces the contact area between the cone-shaped mounting surface 32 of the tool holder shank 12a and the spindle socket 34, the resulting movement of the tool holder will produce wear, in both the spindle 14 and tool holder 12, ultimately resulting in failure of the tool holder 12, spindle 14 or both and reducing the life of the cutting tool.

Figure 3:
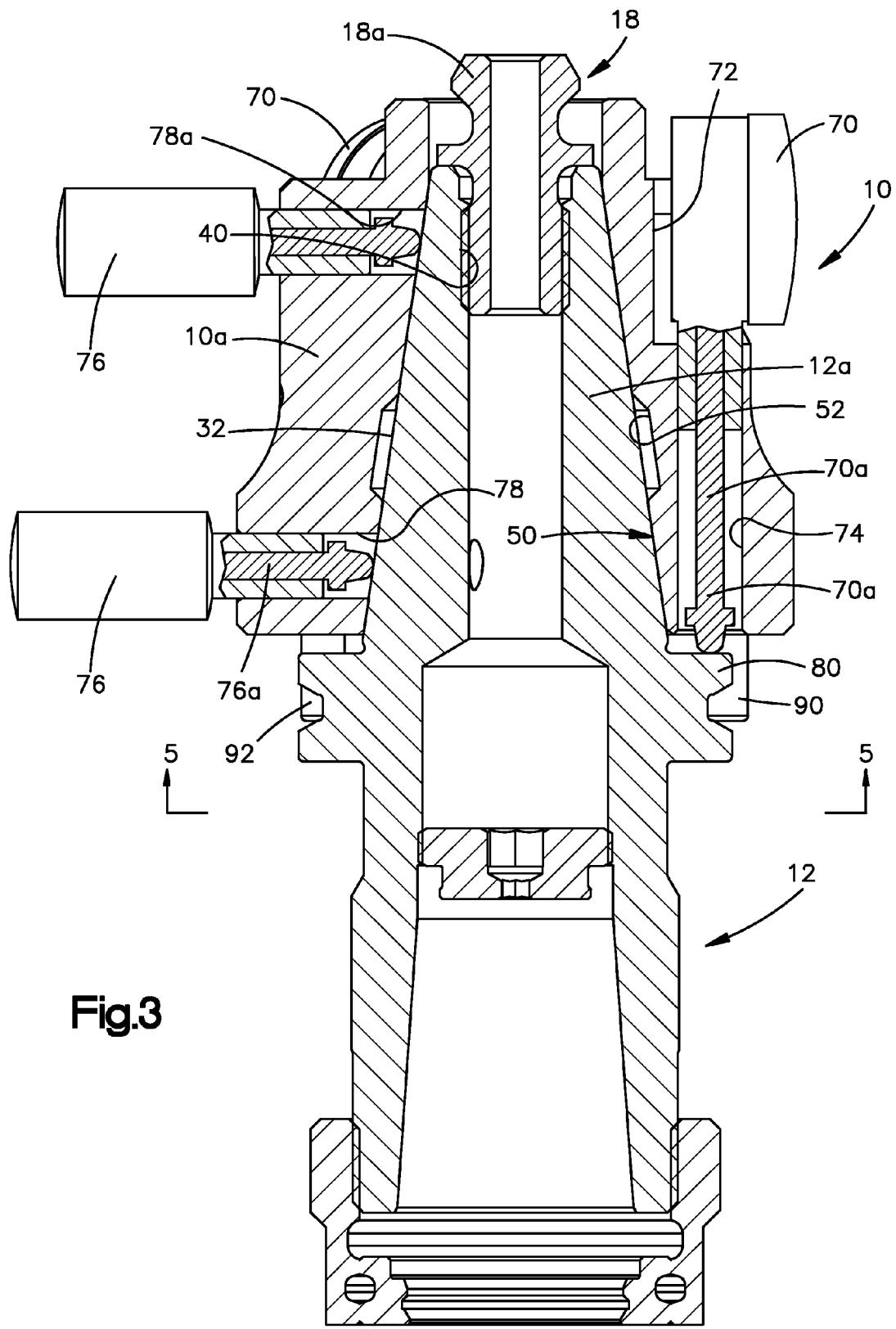
FIG. 3 is a sectional view of the test gauge and tool holder shown in FIG. 1.

The test gauge 10 is used to determine whether the retention knob 18 has been improperly installed and has produced a distortion in the tool holder shank. As seen best in FIG. 2, the test gauge 10 includes a gauge body 10a and a plurality of dial indicators which are used to determine whether the conical mounting surface 32 of the tool holder shank 12a has been distorted. Referring also to FIG. 3, the gauge body 10a defines a tapered bore 50, which receives the conical mounting surface 32 of the tool holder shank 12a. The tapered bore 50 of the gauge body 10a corresponds to the tapered bore defined by the spindle socket 34. In the illustrated and preferred embodiment, the tapered bore 50 of the test gauge body 10a includes a relief portion 52 which does not contact the mounting surface 32 of the tool holder 12a. With the preferred construction, contact between the gauge body 10a and the tool holder shank 12a is established in spaced-apart regions. As viewed in FIG. 3, contact occurs at an upper portion and lower portion of the tool holder-mounting surface 32. This relief portion or undercut 52 is not necessary for the gauge to work properly. It, however, reduces the chances of dirt or chips, etc. on the mounting surface 32 of the to holder causing an incorrect or non-repeatable reading. The gauge body is preferably made of steel and is carburized and hardened to improve its wear characteristics.

As seen best in FIG. 3, the test gauge body 10a carries three, equally spaced dial indicators 70. Each dial indicator 70 is received in an associated machined pocket 72. The pocket includes a downwardly extending bore 74 which receives an operating mechanism of an associated dial indicator 70. The gauge body 10a also mounts two dial indicators 76 at two regions of the test gauge body. The body 10a includes two bores 78, 78a for receiving an operating mechanism of the two dial gauges 76.

As seen best in FIG. 3, each dial indicator 70 includes an operating pin 70a that extends downwardly through the bore 74 and into abutting contact with a reference surface. In the illustrated embodiment, the reference surface is a machined collar 80, forming part of the tool holder 12. In addition, each dial indicator 76, mounted near the upper and lower end (as viewed in FIG. 3) of the test body 10a includes an operating pin 76a that is engageable with the conical mounting surface 32 of the tool holder 12.

Referring now also to FIG. 4, the operation of the test gauge 10 will be explained. As indicated above, FIG. 4 illustrates, in an exaggerated fashion, a distortion 44 in the upper portion of the tool holder shank 12a that is produced by an over-tightened retention knob 18. As seen in FIG. 4, if the upper portion of the tool holder-mounting surface 32 bulges outwardly, the test gauge 10 cannot fully seat on the tool holder shank 12a. As seen in FIG. 4, this results in a gap G between a lower end of the test gauge 10 and the lower portion of the tool-mounting surface 32. This gap G will allow the test gauge to "wobble" on the tool holder shank 12a. This wobble can then be measured by the dial indicator 76 mounted at the lower end of the test gauge body 10a and which includes an operating pin 76a engageable with the conical mounting surface 32 of the tool holder shank 12a.

In a more preferred embodiment, another dial indicator 76 located in an associated bore 78 may be used to determine "wobble" due to a gap between the narrow diameter end of the tool shank and the upper end of the test gauge. This second dial indicator 76 is shown only in FIGS. 3 and 4. This "wobble" occurs if the narrow end of the tool shank is undersized. As will be more fully explained below, the test gauge can then be used to at least partially compensate for this undersize. As an example, a retention knob can be torqued to purposely produce a bulge 44 to compensate for the undersize and thus eliminate the wobble.

Moreover, the existence of the enlarged diameter 44 at the upper end of the tool holder shank 12a, which prevents the gauge 10 from fully seating on the tool holder 12, produces an increase in a distance D between the bottom of the test gauge 10 and the tool holder collar 80. The dial indicators 70 measure this increased distance, which in particular is detected by the operating pins 70a that extend into abutting contact with the collar 80. Using geometry-based calculations, one can calculate the extent to which the upper portion of the tool holder shank 12a has been enlarged, based on measurement data provided by the dial indicators. Calculations that are made to determine the amount that the diameter of the tool holder shank 12a has been enlarged are discussed below.

In order to determine the extent to which the tool holder shank 12a has been distorted, measurements are taken of the tool holder with and without the retention knob 18 installed. In particular, the test gauge 10 is first placed on the tool holder shank 12a before a retention knob 18 is installed. The lower dial indicator 76 is used to confirm that the tool holder shank surface 32 is in good condition. If it is not, the lower dial indicator will measure a "wobble" between the test gauge 10 and the tool holder shank 12a. If this wobble is detected, the tool holder 12 must be replaced or discarded. When the test gauge seats itself on the tool holder, the readings on the dial indicator 70 are noted.

The retention knob 18 is then installed in the tool holder shank 12a and the test gauge 10 is again, mounted on the tool holder 12a. If the installation of the retention knob 18 has produced a distortion in the tool holder shank 12a, this will manifest itself as an increased distance D between the test gauge 10 and the tool holder collar 80. The dial indicators 70 will detect the increase in the distance D. The difference between the measurement taken without the retention knob 18 and the measurement taken with the retention knob 18 can be used to calculate the amount of distortion produced in the tool holder shank 12a by the installation of the retention knob 18. As indicated above, if the distortion prevents the gauge 10 from fully seating on the tool holder shank surface 32, this will also be manifested as a measurable "wobble" between the test gauge 10 and the tool holder 12, as detected by the lower dial indicator 76.

FIGS. 6 and 6A illustrate how the test gauge 10 is used to determine the extent to which the narrow diameter end of the shank 12a has been enlarged by the installation of the retention knob 18. As indicated above, the bulge 44 that is produced by the retention knob prevents the test gauge from fully seating on the shank and, in particular, the test gauge will be spaced a distance D from the tool holder collar 80. In FIG. 6, due to the orientation of the shank 12a, this is shown as a displacement D in the axial direction between the test gauge 10 and the shank 12a. The shank 12a has a known standard taper such as 8.29714°. The following formulas are then used to determine the radial difference that is produced by the bulge 44 due to the retention knob.

TAN(8.29714°)=RADIAL INCREASE/GAGE INDICATION (D)

RADIAL INCREASE=TAN(8.29714°)×GAGE INDICATION

RADIAL INCREASE=0.1458332×GAGE INDICATION

As an example, suppose the test gauge 10 shows a displacement D of 0.0001 inches. The following methodology, based on the above equations, would be used to determine the diameter increase due to the bulge 44.

GAGE INDICATION (D)=0.0001 inches

RADIAL INCREASE=0.1458332×0.0001 inches

DIAMETER INCREASE=2×RADIAL INCREASE

DIAMETER INCREASE=0.00001458322×2

DIAMETER INCREASE=0.00002916664 inches

Figure 5:
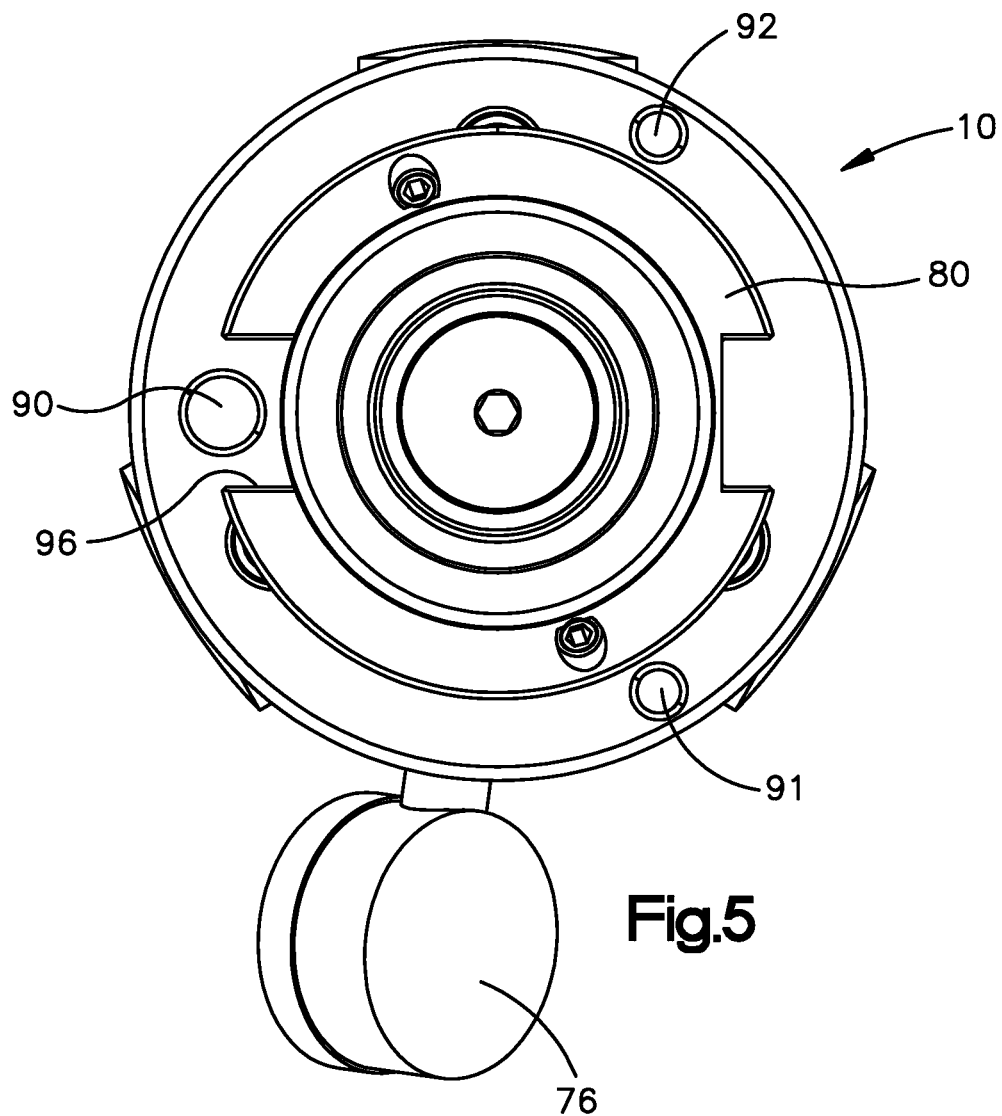
FIG. 5 is a sectional view as seen from the plane indicated by the line 5-5 in FIG. 3.

As seen best in FIG. 5, the gauge 10 includes a plurality of pins or standoffs 90, 91, 92. According to a feature of the invention, these pins serve multiple functions. One function they provide is to act as standoffs or feet to support the gauge 10 when the gauge is placed on a surface such as a table. The use of these standoffs 90-92 prevent contact between the dial indicator operating pin 70a and the surface on which the gauge is resting. Absent the standoffs, the operating pins 70a would be contacted and pressed into theft associated bores if the tool gauge 10 is placed on a flat surface. Because the dial indicators are extremely sensitive, this type of contact with the operating pins could cause damage or inaccuracies in the dial indicators 70.

One of these pins also provide a locating function to ensure that the test gauge 10 is placed on the tool holder in the same position each time it is placed on the tool holder. It has been found that the surface on collar 80 that is contacted by the operating pin 70a is often not a ground surface. As a result, there could be slight surface irregularities on this portion of the collar 80. These irregularities could affect the repeatability of the dial indicator readings when the test gauge is placed on the tool before and after installation of the retention knob 18. Variation in the dial indicator readings caused by irregularities in the contact surface on the collar 80 can be avoided if the test gauge 10 is placed onto the tool holder in the same relative position each time. According to a feature of the invention, this is achieved by using the standoff 90 as a locating pin. Referring to FIG. 5, this is further achieved by making the pin 90 larger in diameter than the pins 91 and 92 and by locating the pins 91, 92 at a larger radius than the pin 90. As seen best in FIG. 5, the locating pin 90 is sized and positioned so that it passes through a drive slot 96 formed in the collar 80. The pins 91 and 92 are sized and positioned so they are located outside a circle defined by the collar and thus pass by the collar when the test gauge 10 is placed on a tool holder.

As seen in FIG. 5, tool holders typically have two drive slots. In order to ensure accuracy, the tool gauge 10 must be positioned on the tool holder so that the locating pin 90 is in the same drive slot 96 when both measurements are made, (i.e., the measurement before the retention knob 18 is installed and the measurement after the retention knob is installed). Many methods can be used to achieve this result, for example, the drive slot can be marked by the user so the same drive slot is used for both measurements. After placing the gauge 10 on the tool holder 12, the gauge should be rotated in a direction preferred by the tester (clockwise or counter-clockwise) with the pin 90 is touching the side of the drive slot 96, then readings can be taken. The gauge 10 should always be rotated in the same direction during a test.

It should be apparent, with the use of the locating pin 90, that variations in the drive collar surface which could produce variations in the dial indicator readings between the first and second measurements can be substantially avoided. Moreover, this feature is provided as part of a tool supporting standoff to prevent damage to the dial indicators.

In the preferred and illustrated embodiment, dial indicators are used to measure the change in distance between the bottom of the test gauge and the reference surface formed by the collar 80. The present invention contemplates other types of measuring devices other than dial indicators to measure a distance between a reference point on a test gauge body and a reference point on the tool holder. The present invention contemplates optical measuring devices, as well as other types of mechanical measuring devices to determine a change in distance between a reference point on a test gauge body and a reference point on the tool holder which is caused by a distortion in the mounting surface 32 of the tool shank 12a. These devices may include but are not limited to laser-based measuring devices/range finders, as well as electronic gauges and optical scanners. The present invention also contemplates alternate measuring devices which may be optically based, for measuring relative movement, i.e., "wobble" between the test gauge 10 and the tool shank 12a which, in the preferred embodiment, as measured by the dial indicators 76.

It should be apparent, that with the disclosed test gauge 10, distortions caused by installation of the retention knob 18 can be detected and remedied. By confirming proper installation of the retention knob 18, machine tool operators can ensure that full contact is maintained between the tool holder shank surface 32 and the spindle socket 34, which ultimately results in longer tool life, as we as improved parts produced by the machines, because tolerances are maintained throughout machine operation. Since the CNC machines, as well as the tool holders, are relatively expensive components, improving the life of the tool holder 12 and the spindle 14 by ensuring proper installation of the retention knobs, can result in significant monies saved by machine tool owners.

The test gauge can also be used to insure that a used or worn tool holder is returned to its previous operating configuration after a retention knob is replaced. Alternately, the test gauge can be used to purposely increase the diameter at the small diameter end of the tool holder to compensate for worn or undersized tool holders. As an example, a tool holder with retention knob that has been in use for some time, can be first measured with the test gauge and a reading taken. The retention knob is then removed and another reading is taken. If the readings are different, that is an indication that the retention knob had produced an increase in the diameter at the narrow end of the tool holder. A new retention knob can then be installed in the tool holder and tightened until the test gauge reading indicates the diameter at the narrow end of this shank has been enlarged to the same extent it was in when the tool holder was removed. For some applications it is important that the tool holder be placed in its original configuration after retention knob replacement so that it properly fits in the machine tool from which it was removed.

The test gauge 10 can also be used to purposely enlarge the narrow diameter end of the tool holder if the tapered surface is undersized or to provide a better fit in a machine tool. For this application, the retention knob is torqued until a desired reading is obtained on the test gauge.

Although the invention has been described with a certain degree of particularity, those skilled in the art can make various changes to it without departing from the spirit or scope of the invention as hereinafter claimed.

The invention claimed is:

1. A test gauge for determining whether a tool holder surface has been distorted, comprising:
   a) a test gauge body defining a tapered bore adapted to receive an associated tapered tool holder surface forming part of a tool holder, said tool holder having an axis of rotation; and,
   b) at least one measurement device having an operating member reciprocally movable along a path substantially parallel to said axis of rotation, said at least one measurement device located and supported by said test gauge body such that when said test gauge body is placed on said tool holder, said operating member is engageable by a reference surface defined by said tool holder.

2. The tool gauge of claim 1 wherein said at least one measurement device is a dial indicator.

3. The test gauge of claim 1 wherein said test gauge body mounts three equally-spaced dial indicators which are concurrently engageable with said reference surface on said tool holder.

4. The test gauge of claim 1 further including two measurement devices each having an operating member reciprocally movable at an angle oblique to said axis of said rotation for said tool holder and engageable with a tapered surface on said tool holder placed in said test gauge.

5. The test gauge of claim 1 further including a plurality of standoffs for spacing said tool body above a work surface to inhibit engagement of said operating member with said work surface.

6. The test gauge of claim 5 wherein one of said standoffs is configured as a locating pin that is engageable with a drive slot formed in said tool holder.

7. A method for determining whether a tapered surface forming part of a tool holder is distorted, comprising the steps of:
   a) providing a gauge body having a bore configured to precisely receive a tapered shank of said tool holder;
   b) placing said gauge body on said tool holder shank prior to installing a retention knob in said tool holder;
   c) making a first measurement by measuring a distance between a reference surface on said tool holder and a reference point on said gauge body;
   d) installing a retention knob in said tool holder; and
   e) reinstalling said gauge body onto said tool holder and making a second measurement by again measuring the distance between said reference surface on said tool holder and said reference point on said gauge body to determine whether there is a difference between the first and second measurements.

8. The method of claim 7 further comprising the step of rotating said gauge body to a predetermined relative position on said tool holder shank so that the first and second measurements are taken with the gauge body in the same relative, rotated position on said tool holder.

9. The method of claim 8 wherein said reference surface on said tool holder is a surface defined by a drive collar forming part of said tool holder.

10. The method of claim 9 wherein said step of rotating said gauge body to the same relative position on said tool holder is achieved by using a locating pin forming part of said gauge body that is engageable by a drive slot formed on said tool holder.

11. A method for determining whether a tapered surface forming part of a tool holder is distorted, comprising the steps of:
a) providing a gauge body having a bore configured to precisely receive a tapered shank of said tool holder;
b) placing said gauge body on said tool holder shank prior to removing a retention knob in said tool holder;
c) making a first measurement by measuring a distance between a reference surface on said tool holder and a reference point on said gauge body;
d) removing the retention knob in said tool holder; and
e) reinstalling said gauge body onto said tool holder and making a second measurement by again measuring the distance between said reference surface on said tool holder and said reference point on said gauge body to determine whether there is a difference between the first and second measurements.

12. The method of claim 11 further including the steps of:
a) reinstalling said retention knob;
b) torquing said retention knob until placement of the test gauge on the tool shank produces the same reading obtained in step c) of claim 11.

\* \* \* \* \*